United States Patent
Lukis et al.

(10) Patent No.: US 6,701,200 B1
(45) Date of Patent: Mar. 2, 2004

(54) AUTOMATED CUSTOM MOLD MANUFACTURE

(75) Inventors: Lawrence Joseph Lukis, Long Lake, MN (US); Yuri Arnoldovich Dreizin, Golden Valley, MN (US); John Mark Gilbert, St. Paul, MN (US)

(73) Assignee: The Protomold Company, Inc., Maple Plain, MN (US)

( * ) Notice: Subject to any disclaimer, the term of this patent is extended or adjusted under 35 U.S.C. 154(b) by 210 days.

(21) Appl. No.: 10/056,755

(22) Filed: Jan. 24, 2002

Related U.S. Application Data (60) Provisional application No. 60/344,187, filed on Dec. 27, 2001.

(51) Int. Cl.$^7$ .............................................. G06F 19/00
(52) U.S. Cl. ........................ 700/98; 700/197; 345/420; 264/401
(58) Field of Search ........................ 700/98, 182, 118, 700/197, 200; 345/420, 964; 264/401

(56) References Cited

U.S. PATENT DOCUMENTS

| | | | |
|---|---|---|---|
| 4,641,270 A | 2/1987 | Lalloz et al. ............... | 700/182 |
| 5,189,626 A | 2/1993 | Colburn ...................... | 700/98 |
| 5,458,825 A | 10/1995 | Grolman et al. ............ | 264/401 |
| 5,641,448 A | 6/1997 | Yeung et al. ............... | 264/401 |
| 5,838,328 A | * 11/1998 | Roller ......................... | 345/420 |
| 6,096,088 A | 8/2000 | Yu et al. ..................... | 703/9 |
| 6,116,888 A | 9/2000 | Johnston et al. ........... | 425/195 |
| 6,175,422 B1 | 1/2001 | Penn et al. .................. | 358/1.1 |
| 6,219,055 B1 | * 4/2001 | Bhargava et al. .......... | 345/850 |

OTHER PUBLICATIONS

The Protomold Company, Inc./Protomold pamphlet 2 pages.

* cited by examiner

Primary Examiner—Leo Picard
Assistant Examiner—Kidest Bahta
(74) Attorney, Agent, or Firm—Shewchuk IP Services; Jeffrey D. Shechuk (57) ABSTRACT

Automated, custom mold manufacture for a part begins by creating and storing a collection of information of standard tool geometries and surface profiles machinable by each of the standard tool geometries. A customer sends a CAD file for the part to be molded to the system. The system assesses the CAD file to determine various pieces of mold manufacturing information. One or more acceptability criteria are applied to the part, such as whether the part can be manufactured in a two-piece, straight-pull mold, and whether the mold can by CNC machined out of aluminum. If not, the system sends a file to the customer graphically indicating which portions of the part need modification to be manufacturable. With any such modifications, the system provides the customer with a quotation of the cost to manufacture the mold or a number of parts. The quotation is based upon mold manufacturing time as automatically assessed from the part drawings. The customer's part is geometrically assessed so the system automatically selects appropriate tools and computes tool paths for mold manufacture. In addition to the part cavity, the system preferably assesses the parting line, the shutoff surfaces, the ejection pins and the runners and gates for the mold. The preferred system then generates CNC machining instructions to manufacture the mold, and the mold is manufactured in accordance with these instructions.

23 Claims, 9 Drawing Sheets

AUTOMATED CUSTOM MOLD MANUFACTURE

CROSS-REFERENCE TO RELATED APPLICATION(S)

This application claims priority from provisional patent application 60/344,187 filed Dec. 27, 2001, entitled AUTOMATED MANUFACTURE OF STRAIGHT PULL MOLDS FOR CUSTOM PLASTIC PARTS.

BACKGROUND OF THE INVENTION

The present invention relates to the field of mold making, and particularly to the manufacture of molds, such as for use with injection molding presses, from blocks of metal. More specifically, the present invention relates to software supported methods, systems and tools used in the design and fabrication of molds for custom plastic parts.

Injection molding, among other types of molding techniques, is commonly utilized to produce plastic parts from molds. Companies and individuals engaged in fabricating molds are commonly referred to as "moldmakers." In many cases (referred to as "straight pull" injection molding), the mold consists of two metal blocks, one top and one bottom. Most commonly, the metal blocks are high quality machine steel, so the mold will have an acceptably long life. Opposed surfaces of each mold block are machined to jointly produce the required cavity in the shape of the desired part, as well as "shut-off" surfaces sealing the cavity when the mold blocks are pressed together. The line on which shut-off surfaces intersect with the surface of the cavity is called the parting line. The corresponding line on the surface of the part formed by the parting line is called the witness mark. After the mold assembly is set up in an injection molding press, parts are made by filling the cavity with molten plastic. The mold blocks are separated from each other after solidification of the molten plastic. The plastic part, normally sticking after separation to the bottom block, is then ejected by means of ejectors.

The moldmaking art has a long history of fairly gradual innovation and advancement. Molds are designed pursuant to a specification of the part geometry provided by a customer; in many cases, functional aspects of the plastic part also need to be taken into account. Historically, moldmaking involves at least one face-to-face meeting between the moldmaker and the customer, in which the customer submits detailed part geometry, usually with the aid of drawings, to the moldmaker and outlines the function of the part. Armed with knowledge of injection molding technology, the moldmaker designs the mold corresponding to the drawings of the part. In particular, the moldmaker orients the part to enable a straight pull mold separation, splits its surface into two areas separated by a suitable parting line, and replicates these areas in the top and bottom blocks. The moldmaker determines the location and shape of the shut-off surfaces and enlarges the dimensions of the cavity relative to the desired part as necessary to account for shrinkage of the plastic material. The moldmaker determines the size and position of one or more gates and runners to provide an adequate flow path for the molten plastic shot into the cavity. Sizes and locations of openings for ejection pins are also selected by the moldmaker. The machining operations to be performed to fabricate the designed mold are determined by the moldmaker. The moldmaker then runs various cutting tools, such as endmills, drills and reams, to machine the basic cavity, shut-off surfaces, runners, gates and ejector pin openings in blocks of metal. To produce certain hard-to-mill features in the mold, the moldmaker may also design and machine electrodes, and then perform electro-discharge machining ("EDM") of the mold blocks. The moldmaker then outfits the mold blocks with ejection pins and prepares the mold assembly for use in the injection molding press. Throughout all of this design and fabrication, the moldmaker makes numerous design choices pertaining to the geometric details of the cavities to be machined as well as to the tools to be used for machining.

All these steps involve a high degree of skill and experience on the part of the moldmaker. Experienced moldmakers, after having considered the design submitted by the customer, may sometimes suggest changes to the part geometry so that the part is more manufacturable and less costly. Highly experienced, gifted moldmakers can charge a premium for their services, both in return for the acuity of their experience and perception in knowing what will and will not work in the mold, and in return for their skill, speed and craftsmanship in machining the mold.

Because of the large number of technical decisions involved and considerable time spent by highly skilled moldmakers in analyzing in detail the part geometry by visual inspection, obtaining a desired injection mold has generally been quite expensive and involved a significant time delay. A single mold may cost tens or hundreds of thousands of dollars, and delivery times of eight to twelve weeks or more are common.

As in many other areas of industry, various computer advances have been applied to the moldmaking art. Today, most of customer's drawings are not prepared by hand, but rather through commercially available programs referred to as CAD (Computer-Aided Design) software. To produce drawings of the molds based on the drawings of custom parts, moldmakers also use CAD software, including packages developed specifically for this task. Also, in most moldmaking companies machining operations are not manually controlled. Instead, CNC (Computer Numerical Control) machines such as vertical mills are used to manufacture molds and, if needed, EDM electrodes in accordance with a set of CNC instructions. To compute detailed toolpaths for the tools assigned by the moldmaker and to produce long sequences of such instructions for CNC mills, computers running CAM (Computer-Aided Manufacturing) software (again, including packages developed specifically for the moldmaking industry) are used by most moldmakers. CAD/CAM software packages are built around geometry kernels—computationally intensive software implementing numerical algorithms to solve a broad set of mathematical problems associated with analysis of geometrical and topological properties of three-dimensional (3D) objects, such as faces and edges of 3D bodies, as well as with generation of new, derivative 3D objects. At present, a number of mature and powerful geometry kernels are commercially available.

While existing CAD/CAM software packages allow designers and CNC machinists to work with geometrically complex parts, they are still far from completely automating the designer's work. Rather, these packages provide an assortment of software-supported operations that automate many partial tasks but still require that numerous decisions be made by the user to create the design and generate machining instructions. CAD/CAM packages usually facilitate such decisions by means of interactive visualization of the design geometry and machining tools. This makes software applicable to a wide variety of tasks involving mechanical design and machining operations. The downside of such versatility, when applied to moldmaking, is that it results in long and labor intensive working sessions to produce mold designs and CNC machining instructions for many custom parts, including parts lending themselves to straight pull molding.

Visualization allows the moldmaker to evaluate whether the mold and injection molded parts can be made sufficiently close to the design using available tools. The fidelity with which plastic parts can be manufactured is limited by the finite precision of mills and cutting tools used to machine the mold, and by shrinkage of plastic materials (slightly changing the shape and dimensions of the injection molded parts as they cool down and undergo stress relaxation in a way that is largely but not entirely predictable). These rather generic factors establish the level of dimensional tolerances for injection-molded parts, the level that is generally known and in most cases acceptable to the customers.

Oftentimes, however, additional factors come into play that can result in more significant deviations of injection molded plastic parts from the submitted design geometry. These factors are usually associated with certain features that are hard to machine in the mold using vertical mills. For example very thin ribs in the part can be made by cutting deep and narrow grooves in the mold, but may require an endmill with an impractically large length to diameter ratio. Machining of angles between adjacent faces joined by small radius fillets (and, especially, of angles left without a fillet) may result in similar difficulties. Exact rendering of such features may substantially increase the cost of the mold, and even make its fabrication impractical with the technology available to the moldmaker.

Obviously, such manufacturability issues need to be identified, communicated to the customer, and, if necessary, rectified before proceeding with mold fabrication. Their resolution normally requires tight interaction between the moldmaker and the customer, as both parties are in possession of complementary pieces of information needed to resolve the issues. The moldmaker has first hand knowledge of the mold fabrication technology available to him, while the customer, usually represented in this process by the part designer, has first hand understanding of part functionality and cosmetic requirements. Based on this understanding, the customer can either agree to the anticipated deviations of part geometry from the submitted specification, or, if the deviations are unacceptable, the customer can modify the part design to resolve manufacturability issues without compromising functional and cosmetic aspects of the design.

As plastic parts often have many unnamed (and hard to name) features, pure verbal communication not supported by visualization of the part can be awkward and misleading. Therefore, communicating such information requires a face-to-face meeting with the customer, in which the moldmaker and the customer view the drawing or image of the part and discuss the issues in detail. Such meetings take a considerable amount of time, both from moldmakers and their customers, and increase business costs.

Resolution of manufacturability issues is closely connected with price quotations requested by customers. When a customer requests a price quotation for a molding project, the moldmaker informally applies a wealth of experience and knowledge to predict costs and various difficulties in fabricating the mold. The potential mold manufacturability issues should be substantially resolved before a binding quotation can be given to a customer. For this reason, it can often take one or two weeks for a customer just to obtain a price quotation. Quoting is performed at a stage when securing the order for the moldmaking job is uncertain, and the cost of quoting must be recovered by the moldmaker from the subset of quotes that are actually accepted.

In the event that the customer contracts with the moldmaker for the job, the quotation becomes a constituent part of the contract for manufacturing the mold and injection molded parts. For obvious reasons the informal quoting method is prone to human errors. If the request for quotation results in the job order, such errors will most likely become apparent during mold design and machining, or even after the mold is finished and used for manufacturing the first plastic parts. The price of such mistakes in terms of the lost time and effort, as well as in terms of strained customer relations, may be rather high. Thus, for a moldmaking business to be successful and profitable, good communication between the customer and the moldmaker in resolving manufacturability issues and accurate quoting are extremely important.

BRIEF SUMMARY OF THE INVENTION

The present invention is a method and system of automated, custom mold manufacture for a part. As a preliminary step, a collection of information of standard tool geometries indicating surface profiles machinable by each of the standard tool geometries is created and stored. To manufacture the mold, a customer sends a CAD file for the part to be molded to the system. The system assesses the CAD file to determine various pieces of mold manufacturing information. In one aspect, the system determines whether the part meets one or more acceptability criteria for the method of mold manufacture chosen. In another aspect, the system sends a file to the customer graphically indicating which portions of the part need modification to be manufacturable in accordance with the method of mold manufacture chosen. In another aspect, the system provides the customer with a quotation of the cost to manufacture the mold or a number of parts. The preferred system geometrically assesses the customer's part and automatically selects appropriate tools and computes tool paths for mold manufacture. The preferred system then generates CNC machining instructions to manufacture the mold, and the mold is manufactured in accordance with these instructions.

While the above-identified drawing figures set forth one or more preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
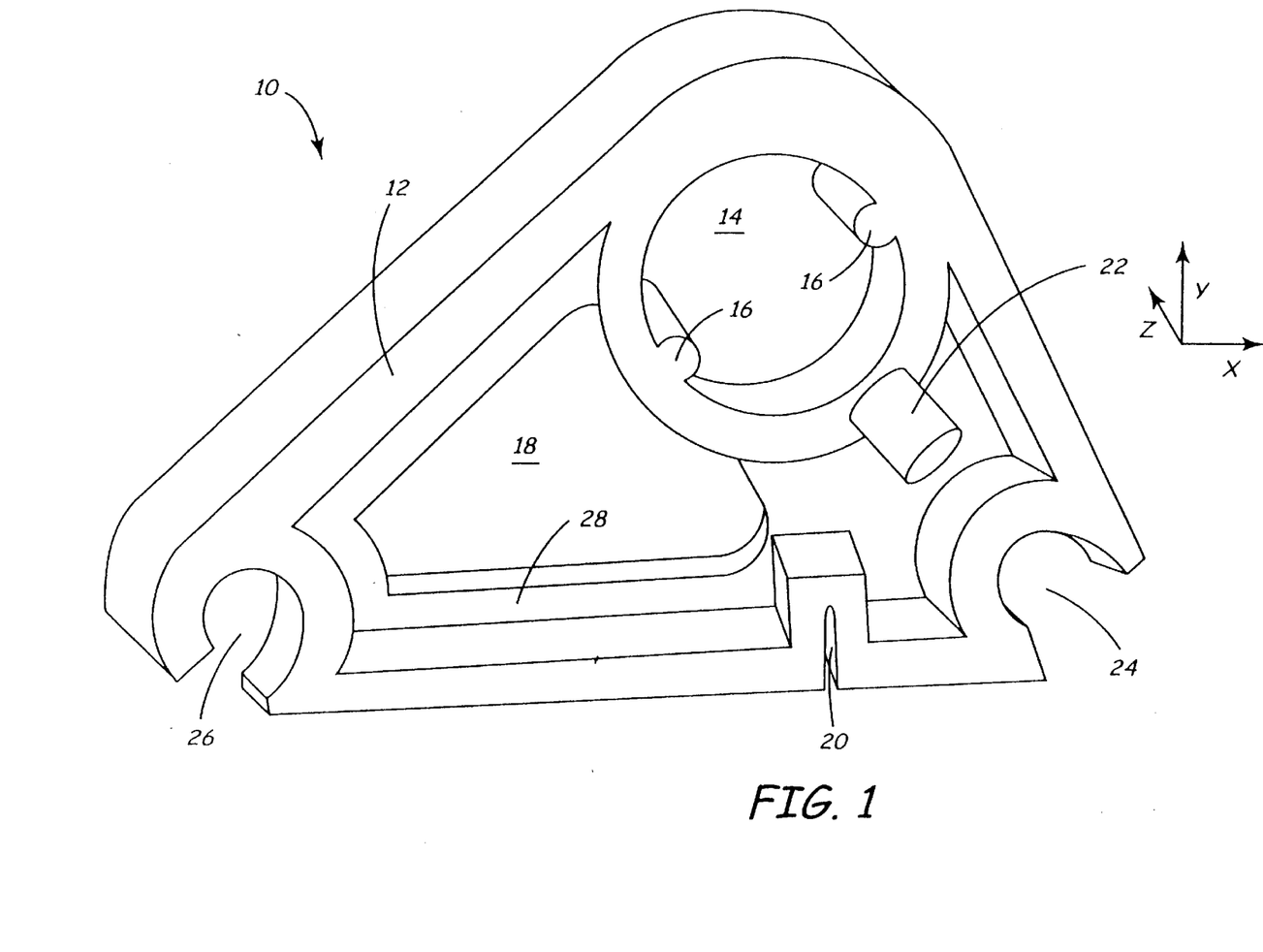
FIG. 1 is a perspective view of an exemplary "cam" part desired by a customer.

The present invention will be described with reference to an exemplary part 10 shown in FIG. 1. FIG. 1 represents a "cam" part 10 designed by the customer. In part because the cam 10 is custom-designed (i.e., not a staple article of commerce) by or for this particular customer, the cam 10 includes numerous features, none of which have commonly accepted names. For purposes of discussion, we will give names to several of these features, including a part outline flange 12, a circular opening 14 with two rotation pins 16, a non-circular opening 18, a notch 20, a rib 22, a 60° corner hole 24, a 30° corner hole 26, and a partial web 28. However, workers skilled in the art will appreciate that the customer may in fact have no name or may have a very different name for any of these features.

Figure 2:
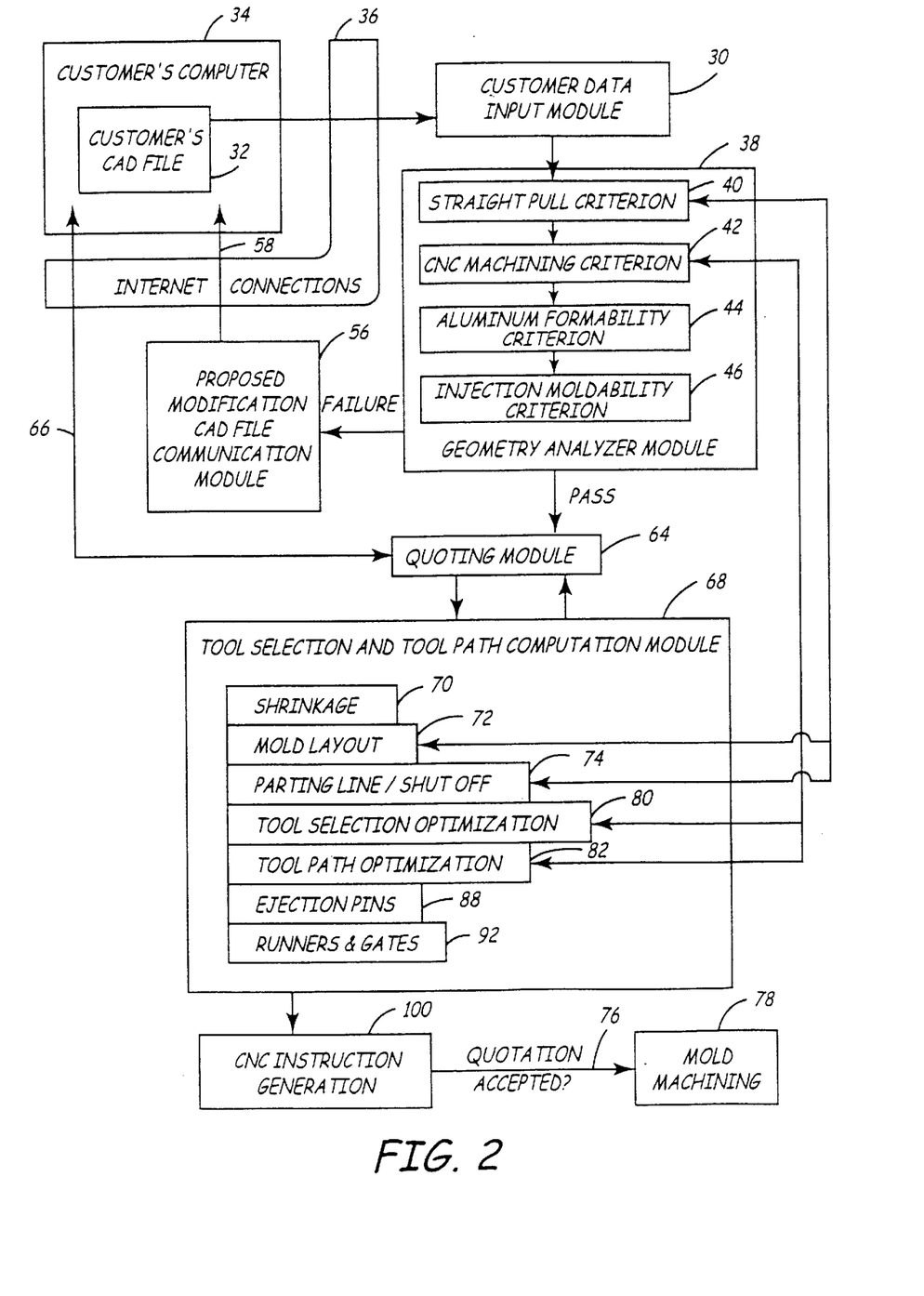
FIG. 2 is a flow diagram of the preferred method followed by the present invention to manufacture the mold for the exemplary "cam" part.

FIG. 2 is a flow chart showing how the present invention is used to manufacture the customer's part. The first step involves a Customer Data Input module 30. Thus, the starting input for the present invention is the CAD part design file 32, provided by the customer from the customer's computer 34. There are several standard exchange formats currently used in the 3D CAD industry. Presently the most widely used format is the Initial Graphics Exchange Specification (IGES) standard. The present invention accepts IGES, STL or various other formats, and is compatible with all the commercial CAD products currently in use.

In contrast to most moldmaker's operations which involve an initial face-to-face meeting with the customer to discuss drawings, the present invention allows the customer to provide the CAD file 32 without a face-to-face meeting. Such communication could occur through a mailed computer disk or through a dial-up modem site. In particular, however, an address on a global communications network such as the internet 36 is configured to receive customer CAD files 32. While the address could be a simple e-mail address, the preferred address is a website on the worldwide-web, configured to receive a CAD file 32 from a customer for the part to be molded. The "web-centric" customer interface preferably include a part submission page as part of the Customer Data Input module 30, which allows the customer to identify which standard CAD/CAM format is being used for the part drawings. Alternatively, the customer's CAD file 32 may be evaluated with an initial program which determines which type of standard CAD/CAM format is being used by the customer. If the CAD file 32 transmitted by the customer does not conform to a recognized standard CAD file format so as to be readable by the software of the present invention, the customer data input module returns an error message to the customer.

The customer's CAD file 32 entirely defines the part 10. The next step in the process is performed by a geometry analyzer module 38, which assesses the geometry of the customer's part 10 using a set of acceptability criteria 40, 42, 44, 46. This geometry analyzer module 38 is used to determine whether the mold for the part defined by the customer's CAD file 32 can be inexpensively manufactured in accordance with the present invention. Various acceptability criteria can be used, depending upon the software and manufacturing capabilities used in automated manufacturing of the mold.

For example, if the software and manufacturing capabilities are limited to manufacturing straight pull molds only, the first preferred acceptability criterion 40 is whether the part can be molded in a straight pull mold. If desired, an individual may view the customer's CAD file 32, either through a printout drawing or on-screen, to visually inspect and determine whether the part can be manufactured in a straight pull mold.

Figure 3:
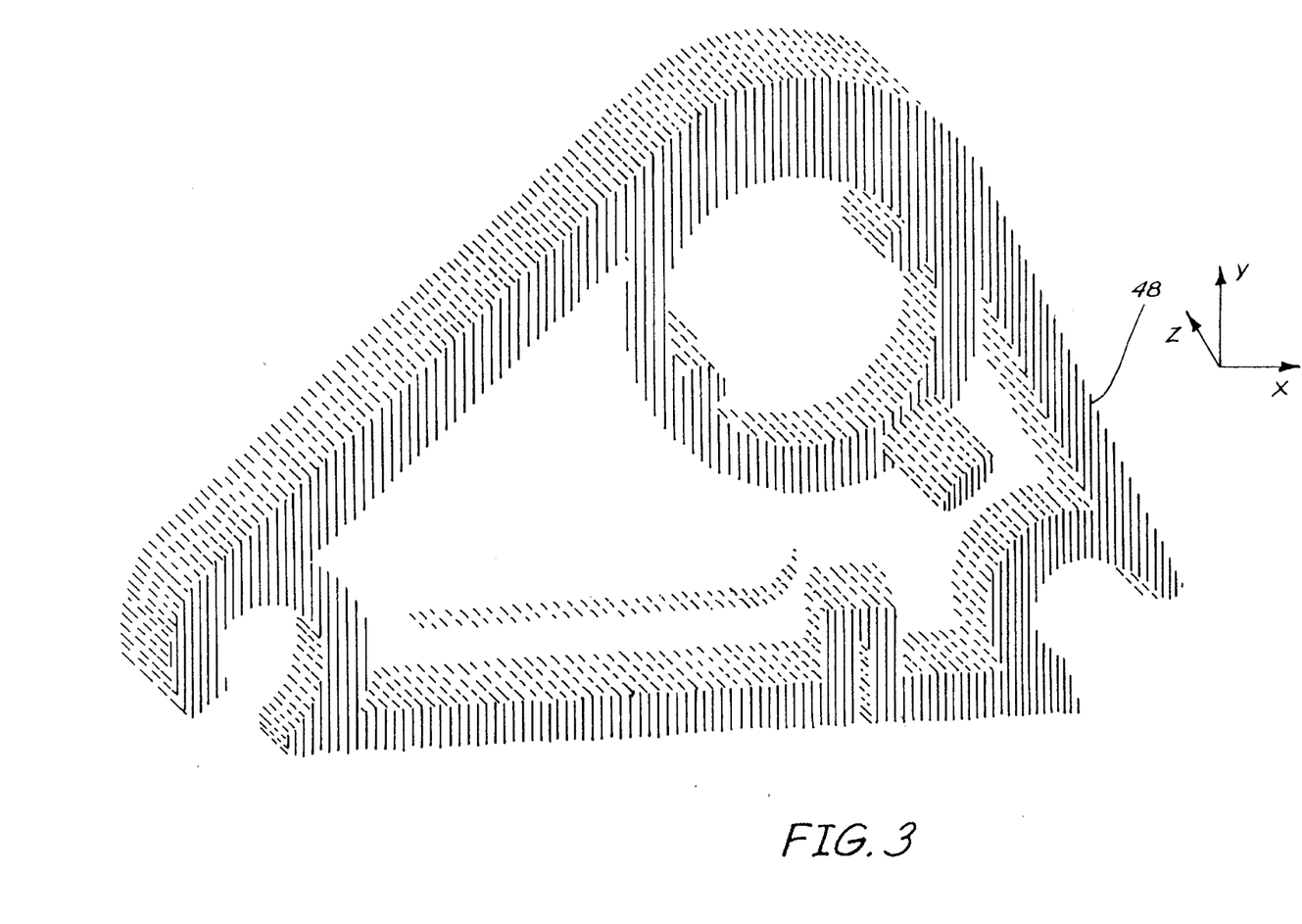
FIG. 3 is a representational view conceptually showing failure of straight pull in a y-axis direction.
Figure 4:
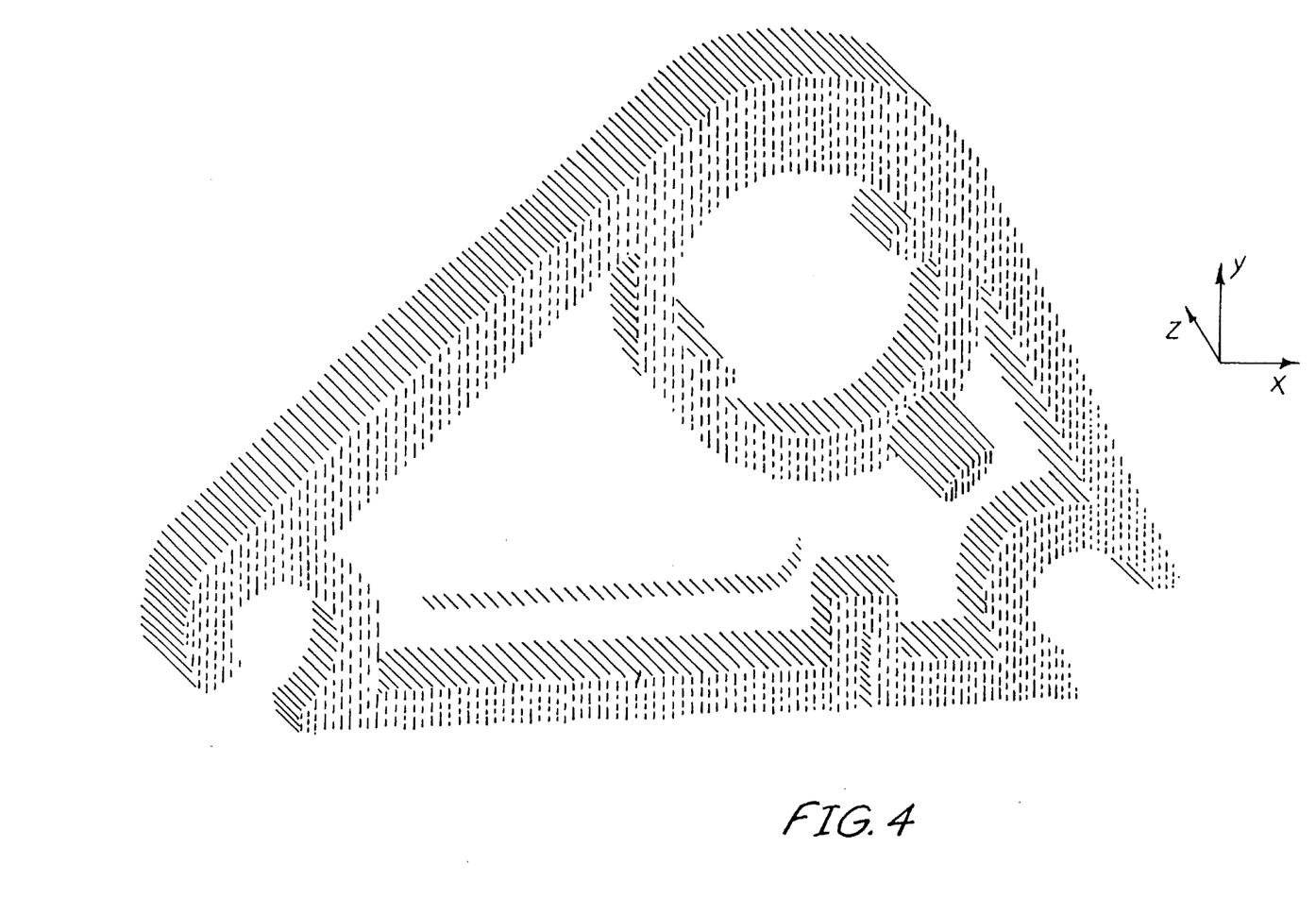
FIG. 4 is a representational view conceptually showing acceptance of straight pull in a z-axis direction.

However, in the preferred embodiment, the program automatically identifies whether the part can be manufactured in a straight pull mold. Automatic "straight pull" manufacturability identification 40 involves selecting an orientation of the part in the customer's CAD file 32. Customers typically draw parts oriented with an x-, y- or z- axis which coincides with the most likely straight pull direction. FIGS. 3 and 4 represent an example of this. First, the cam 10 is solid modelled in the y-direction as a plurality of parallel line segments extending in the y-direction as shown in FIG. 3. The geometry analyzer module 38 then considers each line in the solid modeling, to determine whether the line is continuous and intersects the part surface profile only at a single beginning and a single ending. As shown here, line 48 is a first line which fails this test, as it intersects the cam 10 three times: once through the part outline flange 12 and twice on the sides of the 60° corner hole 24. The y-direction orientation of this part 10 thus fails to permit straight pull mold manufacturability 40. The cam 10 is next solid modelled in the z-direction as a plurality of parallel line segments extending in the z-direction as shown in FIG. 4. The geometry analyzer module 38 again considers each line in the solid modeling, to determine whether the line is continuous and intersects the part surface profile only at a single beginning and a single ending. As shown here in FIG. 4, all the line segments meet this test 40. Because the cam 10 passed the test 40 in the z-direction, it is thus determined that the part 10 can be oriented such that the z-direction is the straight pull direction. Thus, the cam 10 can be formed with a straight pull mold with the straight pull direction coinciding with the z-direction as drawn.

If desired, the "straight pull" manufacturability identification 40 can be terminated once it is determined that at least one orientation of the part 10 exists which can be manufactured with a straight pull mold. Preferably, additional tests continue to be automatically run by the geometry analyzer module 38 to confirm the best orientation of the part 10 which can be manufactured with a straight pull mold. For instance, a similar x-direction test is run, which this cam part 10 fails similar to the z-direction test. Similarly, additional orientational tests can be run, with the parallel lines in the solid modeling run at angles to the x-, y- and z-directions selected in the customer's CAD file 32. If the part passes "straight pull" manufacturability 40 on two or more orientations, then an assessment is made of which orientation should be used for the mold. Computer programmers will recognize that, once the acceptability criteria are defined to include a determination 40 of whether the part can be molded in a straight pull mold and the orientation necessary for molding in a straight pull mold, there are many equivalent programming methods to apply this acceptability criterion 40 to the customer's CAD file 32.

In the preferred embodiment, the present invention further reviews the part design using a second acceptability criterion 42, of whether the mold geometry can be formed through machining with a standard set of CNC machining tools. This second acceptability criterion 42 involves determining which tools are available, what are limitations in using the available tools, and defining areas of the mold (if any) which cannot be machined with the available tools. Because this second acceptability criterion 42 has significant overlap with generating the automated set of CNC machining instructions in the tool selection and tool path computation module 68, it is discussed in further detail below. In particular, however, the preferred standard CNC machining tools include a collection of standard-sized endmills, standard-sized reams and standard-sized drills. With this collection of standard CNC machining tools, limitations exist with respect to the radii of curvature of various edges and corners, and with respect to aspect ratio of deep grooves in the mold. In general, an edge of a part cannot have a tighter radius of curvature than the smallest endmills and drill bits. In general, any grooves in the mold, which correspond to any ribs in the part, must have an aspect ratio which permits at least one of the standard CNC machining tools to reach the depth of the groove.

Figure 5:
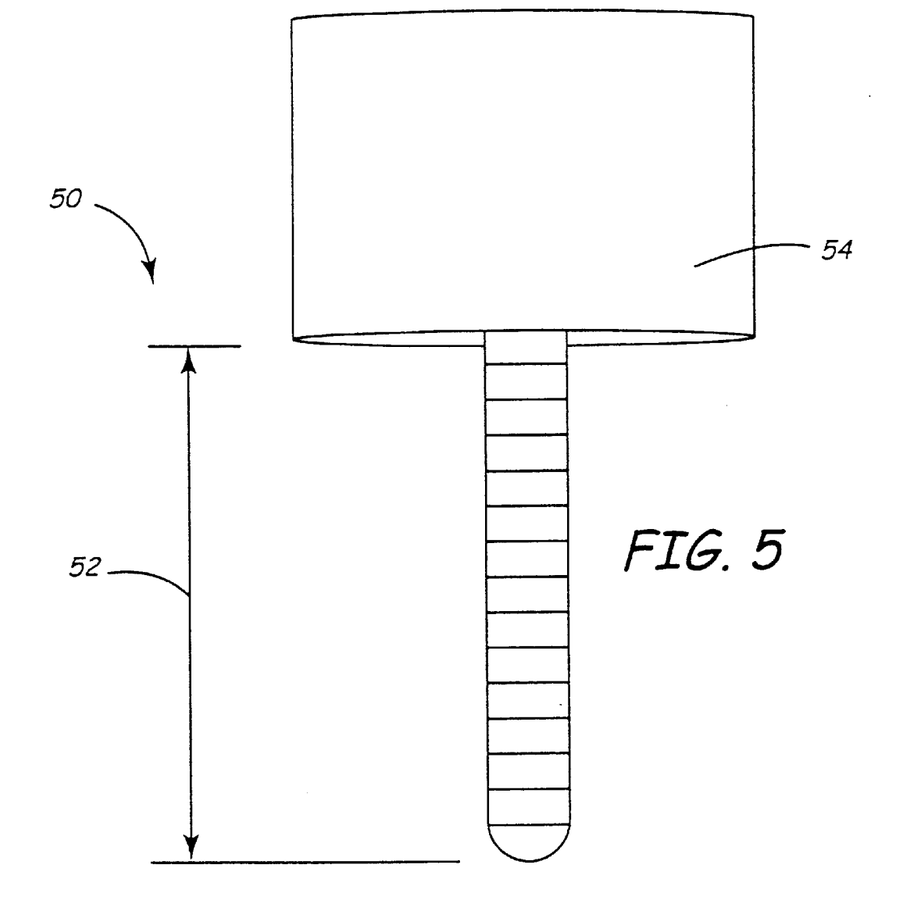
FIG. 5 is an elevational view of a standard endmill.

For example, FIG. 5 depicts the profile of a standard ¼ inch diameter ball endmill 50. This endmill 50 has a cutting depth 52 of slightly less than 2 inches limited by a collet 54. If a ¼ inch thick groove in the mold has a height of 2 inches or more, then the standard ¼ inch diameter endmill 50 cannot be used to form the groove portion of the cavity. The aspect ratios of standard endmills are based upon the strength of the tool steel (so the tool 50 won't easily break in use), and follow a similar aspect ratio curve. That is, all endmills which are less than ¼ inch in diameter are shorter than the standard ¼ inch diameter ball endmill 50. All endmills which are longer than 2 inches are wider than ¼ inch in diameter. Thus, no tool in the standard set can be used to make a groove ¼ inch thick with a height of 2 inches or more. As an approximate rule, ribs should be no deeper than ten times their minimum thickness. The geometry analyzer module 38 includes analysis 42 run against the customer's CAD file 32, to conceptually compare the part shape against collected geometric information of a plurality of standard tool geometries, such a standard endmills. For the cam 10, all of the CAD file 32 passes except for the rib 22, which is too thin and long.

The preferred CNC machining criterion 42 further considers aspect ratios of grooves relative to the parting line of the mold. Because endmills can be used downward in the bottom half (cavity) of the mold and upward in the top half (core) of the mold, aspect ratios of features which contain the parting line can be twice that of aspect ratios of features which do not contain the parting line. That is, groove depth is measured relative to the lowest adjacent extending surface on the half of the mold in which the groove is machined. In the cam 10, for instance, the inside edge of the part outline flange 12 does not intersect the parting line, because the parting line extends along the inside edge of the partial web 28. The depth of the part outline flange 12 is therefore measured relative to the adjacent extending surface, the partial web 28. The aspect ratio determined by this depth of the part outline flange 12 relative to the thickness of the part outline flange 12 must be within the aspect ratio of at least one tool in the standard set. In contrast, the outer edge of the part outline flange 12 has no adjacent extending surface and intersects the parting line. Because the parting line separates the outer edge of the part outline flange 12 into the two mold blocks, the depth of the outer edge of the part outline flange 12 relative to its thickness can be up to twice the aspect ratio of at least one tool in the standard set.

The CNC machining criterion 42 runs similar programming analysis to verify that each corner of the part 10 has a sufficient radius of curvature to permit machining by one of the standard CNC machining tools. For instance, the CNC machining criterion may limit the minimum radius of outside corners of the part to no less than ½ the minimum wall thickness. If the CAD file 32 fails either due to having too deep of grooves or having too tight of corners, the part fails the CNC machining criterion 42, and the customer must be informed. Computer programmers will recognize that, once the acceptability criteria 42 are defined to include a determination of whether groove depths and/or corner radii of the part permit standard CNC machining, there are many equivalent programming methods to apply this acceptability criterion to the customer's CAD file 32.

In the preferred embodiment, the geometry analyzer module 38 further reviews a third acceptability criterion 44, of whether the mold geometry can be formed in aluminum or in an aluminum-based alloy. That is, a design parameter imposed upon the preferred system is that the mold be manufacturable from standard aluminum-based mold block stock. Aluminum is selected for cost reasons, with a primary cost savings in that aluminum is more quickly machined than steel, and a secondary cost savings in that the aluminum blocks themselves are less expensive than steel. However, aluminum is not as strong as steel, and excessively thin structures of aluminum will not withstand the forces imparted during injection molding. Accordingly, the program looks at the mold to determine whether any portions of the mold are too thin. The cam 10 has one thin recess, the notch 20, which if sufficiently thin and deep fails this criterion. That is, as the cam 10 was designed by the customer, the mold for the cam 10 cannot be formed of aluminum and withstand the forces of injection molding. Computer programmers will recognize that, once the acceptability criteria 44 are defined to include a determination of whether the mold can be formed of aluminum, there are many equivalent programming methods to apply this acceptability criterion to the customer's CAD file 32.

One of the preferred inputs to the customer data input module 30 from the customer 34 is the type of plastic material which is selected for the part 10. For instance, the customer data input module 30 may permit the customer to select from any of the following standard plastics: ABS (natural), ABS (white), ABS (black), ABS (gray—plateable), Acetyl/Delrin (natural), Acetyl/Delrin (black), Nylon (natural), Nylon (black), 13% glass filled Nylon (black), 33% glass filled Nylon (black), 33% glass filled Nylon (natural), 30% glass filled PET/Rynite (black), Polypropylene (natural), Polypropylene (black), Polycarbonate (clear), Polycarbonate (black), Ultem 1000 (black), Ultem 2200 (20% glass filled) (black), Ultem 2300 (30% glass filled) (black). Different plastics have different viscosity curves at molding temperatures, different solidification rates, and different shrinkage rates. In the preferred embodiment, the program further reviews a fourth acceptability criterion 46, of whether the mold geometry can be adequately injection molded with the plastic material selected by the customer. This acceptability criterion 46 involves an assessment of whether the mold contains areas that will not shrink uniformly for the selected plastic material, and whether gating can be readily machined into the mold, to result in an acceptable flow path for the plastic which will be met at an attainable mold temperature and pressure so the shot adequately and uniformly fills the cavity.

Additional acceptability criteria could be included, such as related to the size of the part. For instance, the part may need to fit within a maximum projected area, as viewed through the straight-pull axis, of 50 sq. in. (400 sq. cm). Similarly, the part may need to be smaller than a maximum part volume, such as a maximum volume of 18 cu. in. (200 cc).

If the customer's CAD file 32 fails one or more acceptability criteria 40, 42, 44, 46, this failure is communicated to the customer. If desired, the failure to meet any acceptability criteria 40, 42, 44, 46, may be communicated through a telephone call. However, preferably the program automatically generates a computer message which is transmitted to the customer, such as an e-mail. The preferred acceptability failure message indicates the nature of the failure. In the most preferred embodiment, the program includes a proposed modification CAD file communication module 56.

The proposed modification CAD file communication module 56 involves several different steps. First, information is stored about each way in which the part 10 fails an acceptability criterion 40, 42, 44, 46. For instance, not only will information be stored that the cam 10 fails because the rib 22 is too thin and long and because the notch 20 is too deep and thin, but information is also stored about the closest rib and notch which would pass the acceptability criteria 42, 44. That is, by making the rib 22 slightly thicker, the rib 22 can be formed in the mold with standard CNC endmills. By making notch 20 slightly thicker, the aluminum mold will withstand the forces of injection molding. The proposed modification CAD communication module 56 then generates a modified CAD file 58, which distinguishes between the portions of the part geometry which pass all acceptability criteria 40, 42, 44,46 and the portions of the part geometry which fail at least one acceptability criteria 40, 42, 44, 46.

Figure 6:
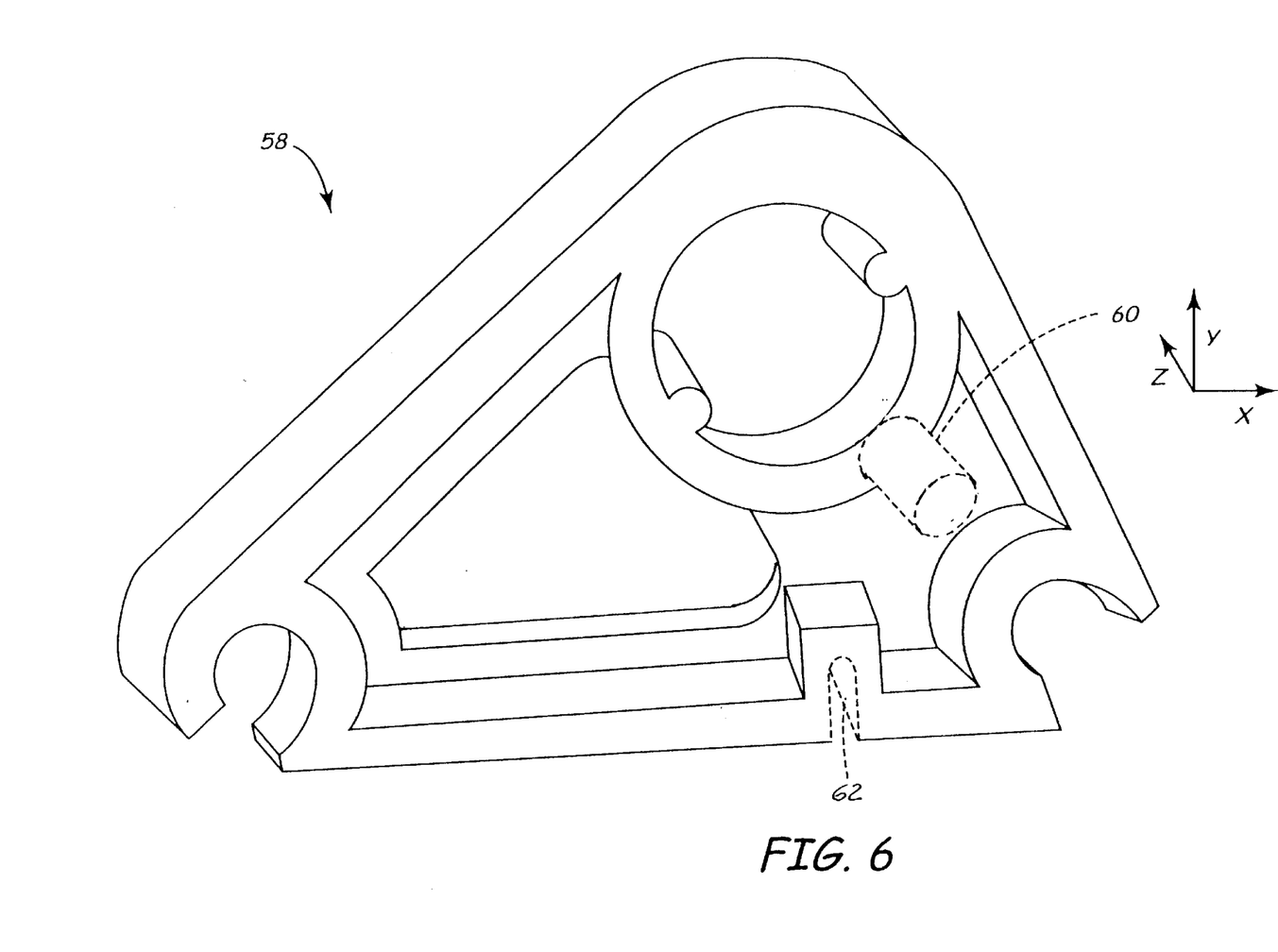
FIG. 6 is an exemplary product deviation file of the exemplary part of FIG. 1.

A drawing from the proposed modification CAD file 58 is shown as FIG. 6. The proposed modification CAD file 58 highlights the closest approximations 60, 62, relative to remaining unaltered portions of the cam design part surface profile 10 which pass all acceptability criteria 40, 42, 44, 46. Highlighting may be done through different line formats, different colors, etc. For instance, using one of predefined color coding schemes, colors are assigned to representative areas to show the identified association of the machinable points and to indicate the lack of appropriate tool. The part geometry supplemented by the color data is preferably placed in a file 58 using one of the standard graphical formats suitable for rendering interactively manipulated three-dimensional views of the part 10. The file 58 together with the legend explaining the color coding scheme used can be sent or otherwise made available to the customer for interactive viewing, possibly with additional comments. The proposed modification CAD communication module 56 then automatically transmits the proposed modification CAD file 58 to the customer, so the customer can view the changes required for inexpensive manufacture of the mold.

Skilled moldmakers will recognize that there are seldom mold designs that can't be done, only mold designs that can't be done without adding significant complexity. For instance, a mold for the cam 10 as originally designed by the customer could be formed, but it would be formed of steel rather than aluminum and the rib portion 22 of the mold would be burned by EMD. The present invention is configured based upon the capabilities of the moldmaking shop. If the moldmaking shop can handle CNC machined aluminum molds as well as EMD steel molds, then the program may assess acceptability criteria for both types of processes. If the customer's CAD file 32 fails at least one acceptability criteria for the less expensive method of mold manufacture, then a first proposed modification CAD file 58 may be generated and transmitted to the customer. If the customer's CAD file 32 passes all acceptability criteria for the more expensive method of mold manufacture, this information may be transmitted to the customer as well.

The present invention thus provides a computerized method for fast identification of the mold manufacturability issues. In ways that have never been before contemplated in the moldmaking art, and in particular without requiring a face-to-face meeting between a customer and an experienced moldmaker, mold manufacturability issues are automatically identified and communicated to the customer. The three-dimensional graphical representation 58 of mold manufacturability issues is very convenient and considerably simplifies communication of such issues to the customers. The geometry analyzer module 38 in tandem with the proposed modification CAD communication module 56 are valuable tools for the design engineer. These modules 38, 56 can be used during the development process to guide the design toward a part 10 that can be manufactured quickly and economically, whether or not it is quoted and manufactured in accordance with the rest of the preferred system.

The next part of the preferred system is the quoting module 64. If desired, quoting may be performed the prior art way, by having an experienced moldmaker review drawings of the customer's part 10 and meticulously consider what may be involved in making the mold. More preferably however, the quoting module 64 automatically generates a quotation 66 for the mold, and transmits the automatically-generated quotation 66 to the customer 34.

To automatically generate a quotation 66, the program must assess one or more cost parameters which are indicative of the real costs which will be incurred to form the mold. The most basic cost parameters preferably considered involve the machining actions which will be used to form the mold. That is, the preferred quotation 66 varies based upon computer analysis by the quoting module 64 of at least one indicator of mold manufacture time. Automatic determination of machining actions and/or other material removal steps in the tool selection and tool path computation module 68 is further detailed below. If machining actions are automatically determined, then the quoting module 64 automatically assesses the determined machining actions to arrive at a quotation 66.

As one example, a primary indicator of overall mold manufacture time is how long it takes to CNC machine the mold. A primary indicator of how long it takes to CNC machine the mold is the number of steps in the series of CNC machining instructions. Thus, the automatic quotation 66 may be based in part or in full on the number of steps in the series of CNC machining instructions.

As a further, more accurate iteration, how long it takes to CNC machine the mold further depends upon which tools are used and what the material removal rate of each tool 50 is. Thus, the quoting module 64 stores information about a rate of material removal associated with each of the different material removal steps. The preferred quoting module 64 automatically identifies an estimated duration of material removal required for each discrete portion of the part surface profile. The automatic quotation 66 may be based in part or in full on a total of estimated durations of material removal.

If desired, the Customer Data Input module 30 may permit the customer to select a special surface finish, such as a polished finish, matte (similar to EDM), or special etched textures. If so, the automatic quotation may further vary based upon the difficulty in applying the selected special surface finish to the mold.

In general, the time required during material removal is only a portion of the time required for CNC machining. Additional time is required to change from one tool to another. For instance, standard CNC machines may include spots for 10 to 40 tools. Changing among these 10 to 40 tools takes additional time. Further, a portion of the cost of CNC machining is based upon the expense and wear rate of the tool 50. Some tools are more expensive than others, and some tools need to be replaced more frequently than others. Even more time and cost may be incurred if a special, custom or delicate tool is required for some material removal steps. As a separate, more accurate enhancement, the quoting module 64 may consider the number and type of tools used in the selected material removal steps.

A separate iteration which improves the accuracy of the quotation 66 involves having the quoting module 64 consider the parting line and corresponding shutoff surfaces of the mold. In general, simple molds which can be formed with an x-y planar parting line and shutoff surfaces are relatively inexpensive. A major portion of the expense of some molds may involve the time required to machine the parting line and corresponding shutoff surfaces which are not x-y planar. Separate from basing the quotation 66 on the number of CNC steps or on the estimated durations of material removal, the automatic quoting module 64 may consider the complexity in forming the parting line and corresponding shutoff surfaces. Alternatively, the quoting module 64 may ignore the complexity of building shut-off surfaces that are necessary in the full-blown mold design, particularly if the design of the shutoff surfaces is not automated.

Yet another separate indicator of mold manufacture time depends on the size of the part 10. Larger molds often take more time. Larger molds certainly require a greater expense in the cost of the raw mold blocks. The preferred quoting module 64 further accounts for the mold block area required for the part 10.

A further separate indicator of mold manufacture time involves ribbing and tightly radiused corners, as discussed previously with regard to acceptability criteria 40, 42, 44, 46 in the geometry analyzer module 38. Deep grooves in the mold and sharper corners take more time to machine. The preferred quoting module 64 further automatically assesses and accounts for the amount, depth and steepness of ribbing required for the part 10.

A further separate indicator of mold manufacturing difficulty and time depends upon whether and which features cannot be standardly CNC machined, but rather require EDM. The existence of any required EDM material removal will increase the cost of the mold. Each feature which requires EDM will increase cost, and more so if the EDM feature is deep enough to require, because of electrode wear, multiple EDM electrodes. The preferred quoting module 64 identifies any different discrete portions of the part surface profile which are associated with different electrodes for EDM, and the automatically generated quotation 66 varies based upon the estimated number of electrodes required.

Many customers have no injection mold experience or equipment, or otherwise are not interested in taking actual possession of the mold. While the cost to manufacture the mold may be the primary cost of the part, customers often want parts, not molds. Accordingly, the preferred quoting module 64 quotes piece prices. Different piece price quotations 66 may be given, for instance, for 10, 100, 1000, or 10000 parts. In addition to the cost of the mold, the primary cost considerations for piece price quotations 66 depend upon what type of plastics material is used, and how much of it. The preferred quoting module 64 automatically provides piece price quotations, which involve the cost of the mold and further vary based upon the volume of the part and the plastic material selected by the customer for injection molding.

The quoting module 64 communicates the quotation 66 to the customer, preferably through the internet 36 such as through the website (if real-time quotation is attained) or through a responsive e-mail to the customer's computer 34. The customer may then accept the quotation 66 through the same medium. The quoting module 64 is another important tool which can be used by design engineers separately from other facets of the preferred system, such as to compare different design alternatives. Since it is fast and easy, instant online quoting is a powerful tool for budgeting and comparing design alternatives during the development process. Design engineers may use online quoting several times in the design of a single part and online quoting will become a very important part of their design process.

The next part of the preferred embodiment involves the tool selection and tool path computation module 68. The tool selection and tool path computation module 68 may be activated upon receipt of an accepted quotation 66, but more preferably operates in conjunction with the quoting module 64 as discussed earlier. The task of the tool selection and tool path computation module 68 is to determine what tools to use and what tool paths should be used with those tools to efficiently manufacture the mold for the part specified by the CAD file 32 of the customer.

As an initial step, the predicted shrinkage 70 of the plastic material upon solidification is applied to the CAD file 32. Based upon the plastic material that the customer indicates will be used to the customer data input module 30, the dimensions are increased in accordance with known shrinkage factors. Subsequent calculations in the tool selection and tool path computation module 68 are based upon the size of the cavity (before shrink, as determine by a shrinkage factor 70) rather than size of the part 10 (after shrink).

As a second initial step, standard mold block sizes are assessed to determine mold block layout 72. Mold layout 72 is the process of assigning and locating one or more core/ cavities onto a standardized mold base. For small, simple parts, two or more identical cavities may be machined into a standard sized mold block. A family mold contains more than one unique part, and is often used to reduce tooling cost for a group of parts that are used together. A multi-cavity mold usually refers to a mold with multiple copies of the same part. This approach is commonly used to reduce per part costs when expected production volume will be significant. Either or both approaches may be utilized using the present invention. Selecting one of several standard mold base sizes determines the size of the raw block of aluminum from which the mold will be formed. If the automatic quoting module 64 is used, information about which standard size of mold block is to be used and the number of cavities in the mold as selected in mold layout 72 is fed back to the automatic quoting module 64.

Before any selection of tools and computations of tool paths can be performed, the orientation of the part relative to the mold must be determined. While this could be performed manually by an experienced moldmaker, the preferred automated method was described earlier with reference to automatic "straight pull" manufacturability identification 40 as one of the acceptability criteria.

Once the orientation of the part relative to the mold is determined, the parting line and corresponding shutoff surfaces are selected 74. The parting line and corresponding shutoff surfaces should be oriented with respect to the part to permit straight pull of the first half and the second half in a straight-pull z-direction during molding of the part. Again, selection of the parting line and corresponding shutoff surfaces could be performed manually by an experienced moldmaker. In the preferred embodiment, the parting line and corresponding shutoff surfaces are automatically oriented 74 with respect to the part 10 as follows.

The CAD file 32 is assessed to automatically determine all edge surfaces which extend parallel to the straight-pull z-direction. For a moment, the parallel edge surfaces are excluded from the determination, as determining the parting line for the other portions of the part 10 is relatively easy. If an edge surface does not extend parallel to the straight-pull z-direction, then the parting line is at the height of the greatest areal extent of the part. Thus, the parting line/shutoff surface portion 74 of the tool selection and tool path computation module 68 automatically defines parting line segments which extend along the uniquely (non z-direction) extending greatest periphery of the part 10. If an edge surface does not extend parallel to the straight-pull z-direction, then the parting line is at the height of the greatest areal extent of the part. The cam 10 has no uniquely (non z-direction) extending periphery of the part, as the part outline flange 12, the circular opening 14, the two rotation pins 16, the non-circular opening 18, the notch 20, the 60° corner hole 24, the 30° corner hole 26, and the partial web 28 all provide edge surfaces which extend in the z-direction.

The unique parting line segments (if any) must now be connected within the edge surfaces which extend parallel to the straight-pull z-direction. Preferably, the parting line selection routine 74 uses the CNC machining criterion 42 and verifies potential z-direction heights of the parting line segments within the parallel edge surfaces, to assure that the selection of the parting line comports with the desired machinability of the mold. For instance, if tool 50 is being used to machine the bottom mold block at a parallel edge surface of the part outline flange 12, and if tool 50 has a cutting depth 52 of two inches, then the parting line segment must be within the bottom two inches of the parallel edge surface of the part outline flange 12.

Once any unique parting line segments are defined and the CNC machining criterion 42 is verified, the parting line selection routine 74 can use any of several optimization routines. For the shortest parting line, the parting line segments within the parallel edge surfaces simply connect the unique and CNC defined parting line segments. To the extent possible, the parting line should be designed to be no steeper than 5–10 degrees. Preferably, a smoothing routine is used to define curved parting line segments within the parallel edge surfaces. In the preferred embodiment, a second derivative of the parting line (i.e., the instantaneous change in slope of the parting line) is minimized in conjunction with minimizing the length of the parting line.

Shutoff surfaces within the mold are automatically determined in much the same way. The shutoff surfaces are those surfaces where the mold halves will contact each other when the mold is closed. First, the shutoff surfaces by definition include the parting line. If the parting line is planar, with no holes inside the part, the shutoff surface is defined to be coplanar with the parting line. In the case of the cam 10, the circular opening 14 and the non-circular opening 18 also represent areas of contact between the shutoff surfaces for the two parts of the mold. The parting line around the part outline flange 12, the parting line around the circular opening 14 and the parting line around the non-circular opening 18 can each be planar. The shutoff surface at the circular opening 14 can be planar, as can the shutoff surface at the non-circular opening 18. Defining the shutoff surfaces can be very complex in the case of a part with a highly articulated parting line and complex internal telescoping shutoffs. Beyond considering the parting line, the preferred embodiment 74 optimizes the selection of the shutoff surfaces. To the extent possible, the shut-off surfaces should be designed to be no steeper than 5–10 degrees. While a straight-line routine could be used, the preferred embodiment used a three-dimensional smoothing routine.

The preferred smoothing routines create a parting line shutoff surface which is mathematically complex, and virtually impossible to hand machine. However, the complex surface is mathematically defined, and translated, into CNC machining instructions. In the CNC machining instructions, the mathematical complexity of the curve is not particularly important. What is important in the CNC machining instructions is that the shut off surfaces are as smooth as possible, and thus can be formed with the largest tool(s) possible and at the fastest material removal rates. Automatic selection 74 of the parting line and corresponding shutoff surfaces thus provides for: (a) a fast assessment of acceptability criterion 42; (b) a fast quotation 66; (c) a fast generation of CNC machining instructions 76; and (d) a fast CNC machining operation 78 to fabricate the mold.

After the parting line and the shutoff surfaces 74 are determined, the preferred method uses the geometry analyzer module 38 to automatically determine the tools and material removal steps required to form the cavity or cavities. The cavity is split in two parts, one for the top mold block and the other for the bottom mold block. In contrast to the shutoff surfaces, which are defined identically but opposite for the two mold blocks, the cavity obviously may have different top and bottom shapes. For each of the two cavity surfaces, the geometry analyzer module 38 generates a cloud of points dense enough to represent the part geometry with acceptable tolerance. For each point in the cloud, the geometry analyzer module 38 traverses the set of machining tools available. That is, a collection of information of standard tool geometries and surface profiles machinable by each of the standard tool geometries is created and stored in the program 38. Because we have already defined the system constraints to include straight-pull manufacturability 40, the preferred collection of information is only considered in the CNC machine with the mold block oriented relative to the tool in the straight-pull z-direction. This stored information is considered by the geometry analyzer module 38 to determine which tools are available to machine a small vicinity of each point without gouging more distant parts of the partial surface either with the tip or shank of the tool 50 or with the collet 54 holding the tool 50. The tool information is traversed starting from the most efficient (fastest material removal, lowest cost) tool and going in the direction of decreasing tool efficiency. The traversal is stopped when several tools that can machine the current point without gouging are found. The association between the points and the identified most effective non-gouging tools is stored in the memory.

If, for the current point, a non-gouging tool could not be found at all, this fact is also stored in memory. The failure to find a non-gouging tool can then be used as the basis for the proposed modification CAD file communication module 56 discussed earlier.

For the collection of points which can be machined, the geometry analyzer module 38 uses a tool selection optimization routine 80 which selects the most efficient tool. In general, the collection of machinable points should be machined with as few tool changes as possible, but still at the highest rate of material removal. The tool selection and tool path computation module 68 automatically identifies and locates discrete machinable portions of the part surface profile which can be machined with a single tool 50, and records the most efficient tool path for that tool 50.

Figure 7:
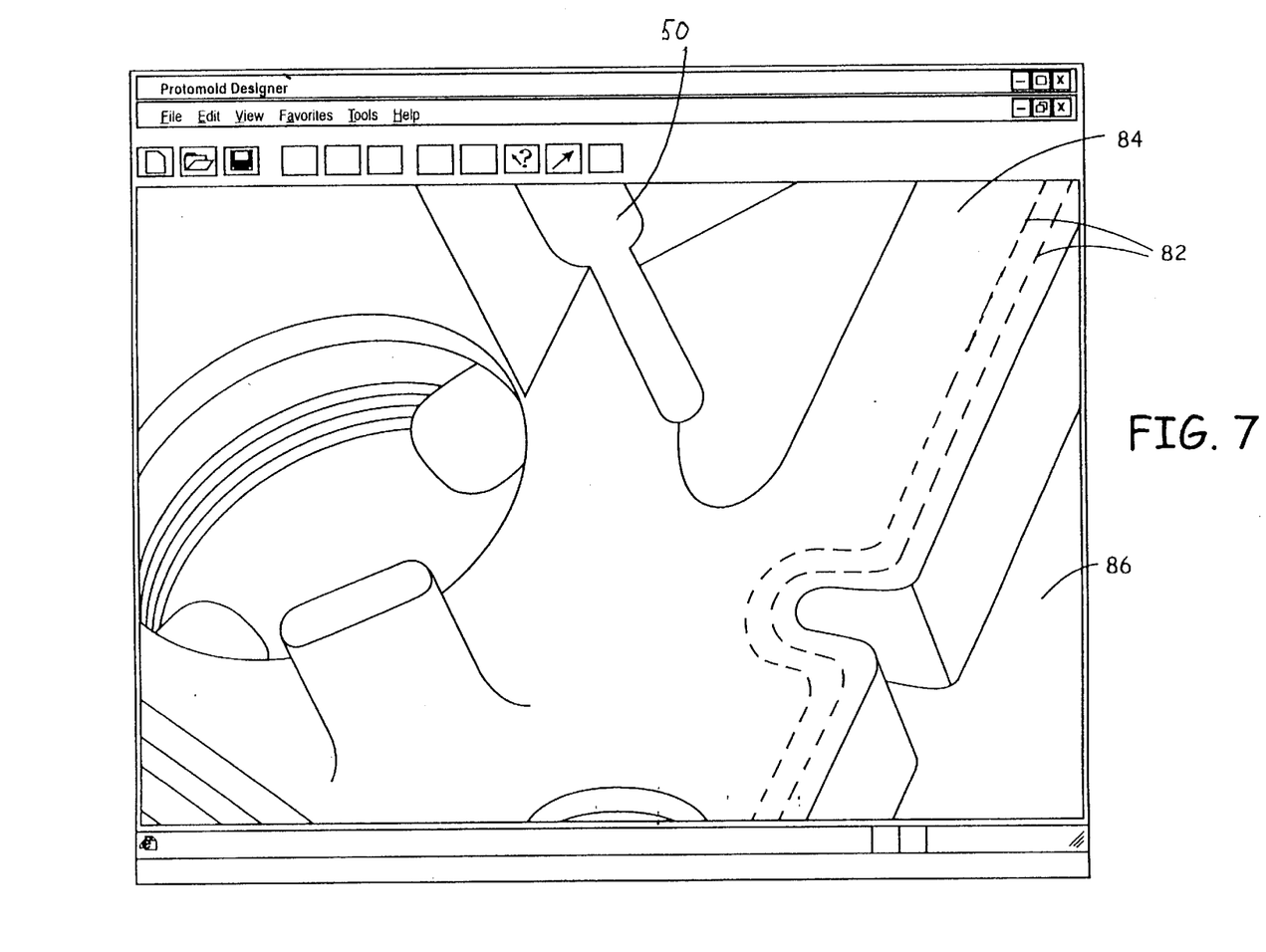
FIG. 7 is a computer screen shot of a perspective view showing the selected tool paths of the standard endmill of FIG. 4 in fabricating the mold for the exemplary part of FIG. 1.

As noted earlier, the preferred tools used in the CNC machining process most commonly include standard-sized endmills. For instance, much of the surface profile for the cavity for the cam 10 can be efficiently machined with the ¼ endmill 50. FIG. 7 is a "screen-shot" representing a portion of an optimized tool path 82 generated so as much of the cavity 84 as possible for the cam 10 can be machined by CNC machining with the ¼ endmill 50.

Figure 8:
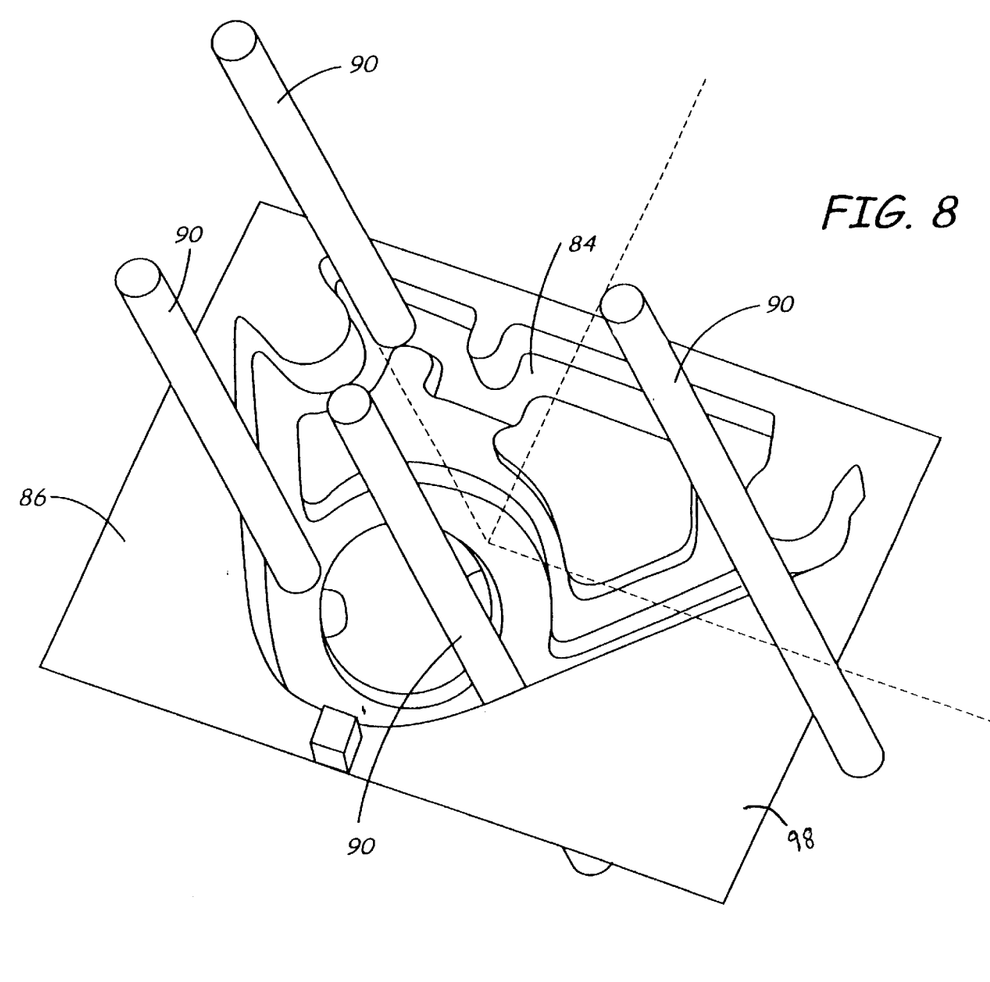
FIG. 8 is a perspective view showing the parting line, the shut-off surfaces, and the ejection pin locations for the exemplary part of FIG. 1.

The preferred tool selection and tool path computation module 68 determines the other portions of the mold 86 as well. In particular, the preferred tool selection and tool path computation module 68 automatically identifies 88 sizes and locations of ejector pins 90, as shown in FIG. 8. Ejector pins 90 are used to push the part 10 out of the mold 86 after it has been formed. In general, ejector pin selection 88 considers the profile of the mold 86 to determine the deepest locations which provide significant surface area extending perpendicular to the straight-pull z-direction. The ejector pin selection routine 88 centers ejector pin locations on these flat surfaces, and sizes the ejector pins 90 by selecting the largest standard size that will fit within each flat surface.

Figure 9:
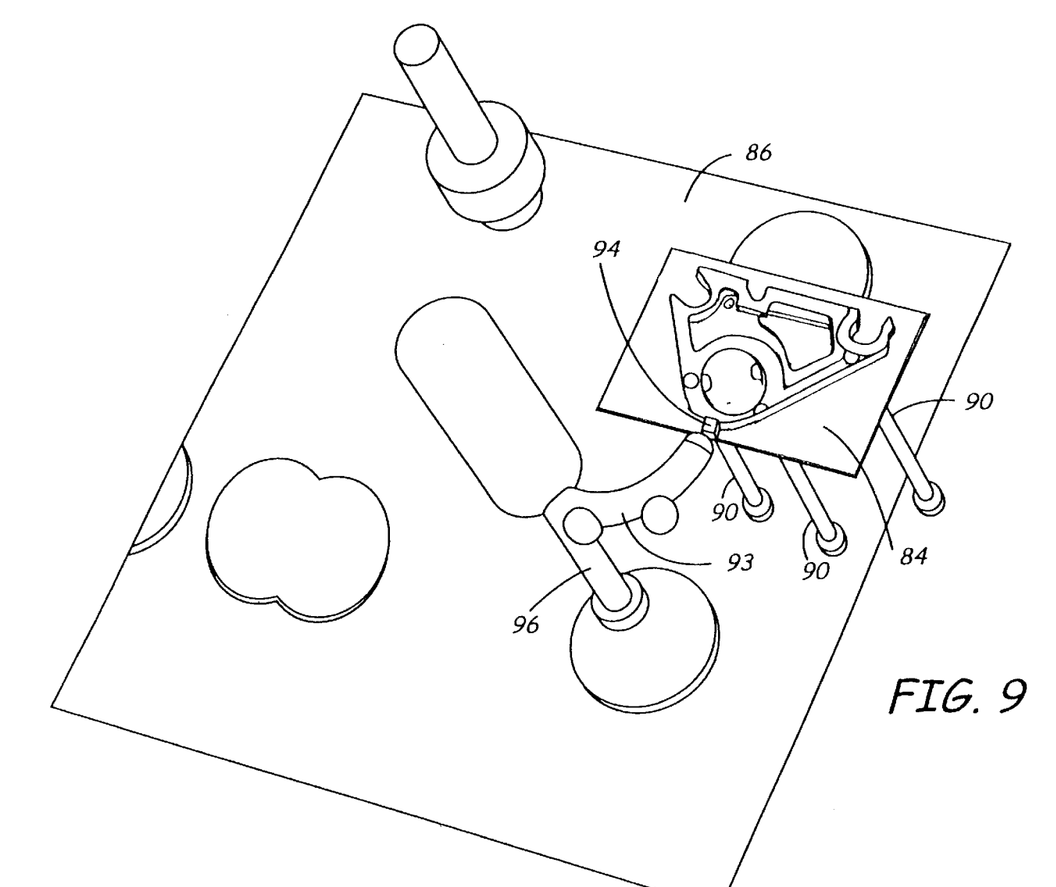
FIG. 9 is a perspective view showing sprews, runners, gates and ejection pins for the mold for the exemplary part of FIG. 1.

The preferred tool selection and tool path computation module 68 also automatically identifies 92 sizes and locations of runners 93 and gates 94, as shown in FIG. 9. A gate 94 is the place on the mold 86 where the plastic is injected into the mold cavity 84 as a part is being produced. A runner 93 is the path on the mold 86 where the molten plastic travels to get from the molding machine to the gate(s) 94 and into the part cavity 84. The sizes of runners 93 and gates 94 are selected 92 from knowledge of standard cutting tool sizes, based upon the plastic material selected by the customer, the volume of the part, and the known flow constraints of that plastic material. The locations of the gates 94 are generally selected 92 to connect to the part 10 on a surface which extends parallel to the z-direction, and to minimize seam lines in the part 10 based upon flow geometry. The locations of the runners 93 are generally selected 92 to be as straight as possible from the sprue location 96 to the gates 94.

Once the parting line and shutoff surfaces 98 have been defined (step 74), the mold layout has been specified 72, the tools have been selected 68, and the tool paths for the cavity 84 have been computed 80, the preferred method includes a CNC instruction generation module 100 which generates the detailed instructions 76 that will be used by the CNC milling equipment to cut the mold 86 from a raw block of aluminum. The CNC instruction generation module 100 generates a series of CNC machining instructions 76 corresponding to machining the mold 86 with the selected tools and computed machining actions. For instance, the CNC instruction generation module 100 may generate a "g-code" program containing a set of instructions 76 for CNC milling machines. If desired, the shape of the cavity 84 as machined in the mold block can be visualized with one of the g-code viewers developed for up-front visual verification of machining under the control of g-code programs, and the shape of the cavity 84 can be visually compared with drawings of the part 10. CNC machining instructions 76 are generated to machine ejector pin locations 90, sprues 96, runners 93, gates 94 etc. into the mold blocks.

The final step in the preferred process is machining 78 the mold 86. The shutoff surfaces 98 are machined into the mold blocks with the selected tools and computed machining actions and via the computer generated series of CNC machining instructions 76. The cavity 84 is likewise machined into the first and second halves of the mold 86. Locations for ejector pins 90 are machined into the first and second halves of the mold 86 via the computer generated series of CNC machining instructions 76, as are runners 93 and gates 94.

If the quotation 66 involve a piece price quotation, the number of pieces ordered by the customer are run in an injection mold press. The pieces are shipped back to the customer. The customer is billed in accordance with the quotation 66.

The present invention allows mass production techniques to be used in the moldmaking process, even though every mold is custom designed, custom machined and different.

Although the present invention has been described with reference to preferred embodiments, workers skilled in the art will recognize that changes may be made in form and detail without departing from the spirit and scope of the invention. As one example, while the present invention has been described with relation to various patentable features being performed in separately named modules, computer programmers will recognize many equivalent options exist for naming of the modules and organization of the programming features. As another example, while the present invention as described is constrained to require straight-pull, two-piece molds, enhancements may be made to support side actions in the mold. Permitting side action molds will overcome the current requirement that parts be producible in simple straight-pull molds. Side action molds allow molding parts with undercut faces—faces that cannot be placed entirely in one subset because they have areas that need machining from opposite directions. Permitting side action molds will thus increase the percentage of parts that are eligible for the automated process.

What is claimed is:

1. A method of automated, custom mold manufacture for a part, the mold having a first half and a second half opposed to the first half, the first half and the second half together defining a cavity corresponding in shape to the part to be molded in the cavity, the method comprising:

creating a collection of stored information of standard tool geometries indicating surface profiles machinable by each of the standard tool geometries;

receiving a CAD file from a customer for the part to be molded, the CAD file defining a part surface profile;

assessing the CAD file to determine a straight pull z-direction, a parting line and corresponding shutoff surfaces separating the first half and the second half of the mold, so that the parting line and corresponding shutoff surfaces are oriented with respect to the part to permit straight pull of the first half and the second half in a straight-pull z-direction during molding of the part;

based upon the determined orientation of the straight-pull z-direction with respect to the part, processing the CAD file with a computer to automatically identify and locate a plurality of discrete machinable portions of the part surface profile, each machinable portion corresponding to a machining tool path machinable with a selected tool from within the collection of standard tool geometries, each of the machinable portions being tool accessible with the selected tool oriented in the straight-pull z-direction;

based upon the plurality of discrete machinable portions, computer generating a series of CNC machining instructions corresponding to machining the mold with the selected tools and computed machining tool paths; and machining the cavity into the first and second halves of the mold with the selected tools and computed machining tool paths via the computer generated series of CNC machining instructions.

2. The method of claim 1, wherein a plurality of the standard tool geometries indicating surface profiles machinable by each of the standard tool geometries are representative of standard endmills.

3. The method of claim 1, further comprising:

automatically determining modification locations for the CAD file on the part to be molded, the modification locations corresponding to locations which are not tool accessible with any tool from within the collection of stored information of standard tool geometries while oriented in the straight-pull z-direction;

automatically determining closest approximations of the modification locations which are tool accessible with at least one tool from within the collection of stored information of standard tool geometries while oriented in the straight-pull z-direction;

creating a proposed modification CAD file which highlights the closest approximations relative to remaining unaltered portions of the part surface profile which are tool accessible with at least one tool from within the collection of stored information of standard tool geometries while oriented in the straight-pull z-direction; and transmitting the proposed modification CAD file to the customer.

4. The method of claim 1, further comprising:

automatically determining modification locations for the CAD file on the part to be molded, the modification locations corresponding to locations which cannot be adequately injection molded with a plastic material selected by the customer;

automatically determining closest approximations of the modification locations which can be adequately injection molded with the plastic material selected by the customer;

creating a proposed modification CAD file which highlights the closest approximations relative to the remaining portions of the part surface profile which can be adequately injection molded with a plastic material selected by the customer; and transmitting the proposed modification CAD file to the customer.

5. The method of claim 4, wherein the act of automatically determining modification locations is performed through computer analysis based upon at least one of flow constraints and shrinkage of the plastic material selected by the customer.

6. The method of claim 1, wherein the orientation of the parting line with respect to the part is computer determined by solid modeling the part in a particular orientation as a plurality of parallel line segments, wherein the parting line is selected at an orientation wherein each line segment in the solid modeling crosses the parting line and wherein each line segment in the solid modeling is continuous and intersects the part surface profile only at a single beginning and a single ending.

7. The method of claim 1, wherein the orientation of the parting line and corresponding shutoff surfaces with respect to the part comprises:

automatically determining all edge surfaces which extend parallel to the straight-pull z-direction;

automatically defining parting line segments which extend along the remaining uniquely extending greatest periphery of the part; and within the edge surfaces which extend parallel to the straight-pull z-direction, optimally connecting ends of the defined parting line segments.

8. The method of claim 1, wherein the first and second halves of the mold are formed from aluminum or an aluminum-based alloy.

9. The method of claim 1, further comprising:

automatically identifying, via computer, sizes and locations of ejector pins, with ejector pin locations machined into the first and second halves of the mold via the computer generated series of CNC machining instructions.

10. The method of claim 1, further comprising:

automatically identifying, via computer, sizes and locations of runners and gates, with the runners and gates machined into the mold via the computer generated series of CNC machining instructions.

11. The method of claim 1, further comprising:

automatically generating a quotation based upon the computed CNC machining tool paths; and transmitting the automatically-generated quotation to the customer.

12. A method of automated, custom mold manufacture for a part, the mold having at least two separable portions together defining a cavity corresponding in shape to the part to be molded in the cavity, the method comprising:

creating a collection of stored information of geometrical constraints of different material removal steps;

receiving a CAD file from a customer for the part to be molded, the CAD file defining a part surface profile;

assessing the CAD file to determine a parting line and corresponding shutoff surfaces between separable portions of the mold;

based upon the determined orientation of the parting line and corresponding shutoff surfaces with respect to the part, processing the CAD file with a computer to automatically identify and locate discrete portions of the part surface profile, each discrete portion corresponding to a material removal step from within the collection of stored information, each of the discrete portions being manufacturable with the selected material removal step;

based upon the identified discrete portions and selected material removal steps, automatically generating a quotation of mold formation with the selected material removal steps, the quotation varying based upon computer analysis of at least one indicator of mold manufacture time; and communicating the automatically-generated quotation to the customer;

after customer acceptance of the quotation, forming the cavity into the separable portions of the mold with the selected material removal steps; and billing the customer in accordance with the quotation.

13. The method of claim 12, wherein the material removal steps are standard CNC machining operations, and further comprising:

computer generating a series of CNC machining instructions corresponding to machining the mold with the selected material removal steps; and wherein the indicator of mold manufacture time comprises the number of steps in the computer generated series of CNC machining instructions.

14. The method of claim 12, wherein the collection of stored information further contains a rate of material removal associated with each of the different material removal steps, wherein the processing the CAD file with a computer further automatically identifies an estimated duration of material removal required for each discrete portion of the part surface profile, and wherein the indicator of mold manufacture time comprises a total of estimated durations of material removal.

15. The method of claim 12, wherein the determined parting line and corresponding shutoff surfaces are not x-y planar, and wherein the indicator of mold manufacture time comprises automatically accounting for complexity in forming the parting line and corresponding shutoff surfaces.

16. The method of claim 12, wherein the indicator of mold manufacture time comprises automatically accounting for the number and type of tools used in the selected material removal steps.

17. The method of claim 12, wherein the indicator of mold manufacture time comprises automatically accounting for the mold block area required for the part.

18. The method of claim 12, wherein the indicator of mold manufacture time comprises automatically accounting for the amount, depth and steepness of ribbing required for the part.

19. The method of claim 12, wherein the automatically generated quotation comprises a piece price quotation, wherein the piece price quotation varies based upon volume of the part and plastic material selected by the customer for injection molding.

20. A method of automated, custom mold manufacture for a part, the mold defining a cavity corresponding in shape to the part to be molded, the method comprising:
- creating a collection of stored information of geometries of material removal steps indicating surface profiles formed by the material removal steps to transform a mold block into a custom mold;
- receiving a CAD file over a global communications network from a customer for the part to be molded, the CAD file defining a part surface profile;
- automatically processing the received CAD file with a computer to identify and locate discrete portions of the part surface profile, each discrete portion corresponding to at least one surface profile of one material removal step from within the collection of stored information;
- automatically generating a quotation based upon the identified and located material removal steps; and
- automatically transmitting the automatically generated quotation to the customer over the global communications network.

21. The method of claim 20, further comprising:
- determining modification locations for the CAD file on the part to be molded, the modification locations corresponding to locations which cannot be formed into the cavity through material removal steps from within the collection of stored information;
- determining closest approximations of the modification locations which can be formed into the cavity through material removal steps from within the collection of stored information;
- creating a proposed modification CAD file which highlights the closest approximations relative to the remaining portions of the part surface profile which can be formed through material removal steps from within the collection of stored information; and
- transmitting the proposed modification CAD file to the customer.

22. The method of claim 20, wherein at least one material removal step is through EDM, wherein different discrete portions of the part surface profile are associated with different electrodes for EDM, and wherein the automatically generated quotation varies based upon the number of electrodes required.

23. A system for automated, custom mold manufacture for a part, system comprising:
- an internet address configured to receive a CAD file from a customer for the part to be molded, the CAD file defining a part surface profile;
- a collection of stored information of material removal steps indicating surface profiles formed by the material removal steps to transform a mold block into a custom mold; and
- one or more processors collectively programmed for:
  - identifying and locating discrete portions of the part surface profile of the received CAD file, each discrete portion corresponding to at least one surface profile of one material removal step from within the collection of stored information;
  - generating a quotation based upon the identified and located material removal steps; and
  - transmitting the generated quotation to the customer over the internet.

* * * * *